UNITED STATES PATENT OFFICE.

CHARLES H. LAND, OF DETROIT, MICHIGAN.

CEMENT MEDIUM COMPOUND.

No. 895,094.　　　Specification of Letters Patent.　　　Patented Aug. 4, 1908.

Application filed October 25, 1907. Serial No. 399,204.

*To all whom it may concern:*

Be it known that I, CHARLES H. LAND, a citizen of the United States, residing at Detroit, in the county of Wayne and State of Michigan, have invented certain new and useful Improvements in Cement Medium Compounds, of which the following is a specification.

My invention has for its object a novel compound which I term a "cement medium compound."

My invention consists of the various elements all combined as hereinafter described and claimed, the same being adapted for a variety of uses.

My invention is more especially designed as a means to assist the oxychlorid of zinc, and the oxyphosphate of zinc cements, commonly employed in dentistry as a filling for teeth to chemically and homogeneously adhere to vitreous and other substances, such as glass, porcelain, pottery and the like.

My improved compound has primarily for its object the creation thereby of new articles of manufacture to be employed in dentistry, and for other uses, for which I have made application for separate Letters Patent embodying the same, prepared and filed by me in the United States Patent Office of date February 26, 1904, Serial No. 195,406. This medium essentially comprises oxid of zinc, or its equivalent, oxid of magnesia, combined with an oleo-resinous vehicle, phosphate of soda and other substances, in sufficient quantity to form a partial flux so that the compound will adhere to vitreous surfaces when heated to a sufficient temperature.

I have found the following to be a suitable method or process of manufacturing my improved "cement medium compound," viz., by fusing together either the oxid of zinc, or the oxid of magnesia, or both combined, with an oleo-resinous vehicle, as with the phosphate of soda as a flux in substantially the following proportions, to-wit: 1 oz. oxid of zinc, or of oxid of magnesia. 1 dwt. phosphate of soda ground to an impalpable powder. And equal parts of an oleo-resinous substance, such as balsam of copaiba, oil of tar, oil of lavender, or their equivalent. Each of the oxids above named is adapted to combine with phosphoric acid contained in ordinary dental cements.

This compound forms, or may form, substantially, a paint similar to that which is used in decorating china, glass or pottery and when fired to the surface of vitreous substances, establishes thereon a thin film to which the ordinary dental cements will chemically combine, and may be regarded as a thin coating or medium suitable to cause the phosphoric acid contained in dental cements, commonly used as filling material for decayed teeth, to homogeneously adhere to the same. At the same time the cement qualities will not be destroyed, in consequence of which, when phosphoric acid and fused oxid of zinc are mixed into a pasty mass and immediately brought in contact with a similar compound that has been first fused to a vitreous surface, a chemical and homogeneous union becomes established whereby dissimilar substances may be made to cohere so substantially that they will resist the action of all ordinary solutions even resisting water at the boiling point. Under such circumstances it will be seen that such a compound, enabling such results to be secured, is exceedingly useful as when applied to various dental operations, such as cementing porcelain fillings as crowns to the root of natural teeth.

While I have described above certain proportions of the various ingredients entering into my improved medium compound, I would have it understood that I do not limit myself to any fixed proportions of the various elements entering into said compound, as the proportions might be varied without altering the essential features of my invention.

The medium may be partially fused to a vitreous substance at about 1800 degrees Fahrenheit. The two oxids, oxid of zinc and oxid of magnesia are allied in their action in forming an insoluble cement joint between vitreous surfaces, both oxids combining, separately or together with phosphoric acid under the same conditions.

What I claim as my invention is:

1. A cement medium compound comprising an oxid adapted to combine with phosphoric acid and an oleo-resinous vehicle.

2. A cement compound comprising an oxid adapted to combine with phosphoric acid, a flux, and a flowing medium.

3. A cement media compound composed of an oxid adapted to combine with phosphoric acid, phosphate of soda, balsam of copaiba, oil of tar, and oil of lavender, substantially as set forth.

In testimony whereof I have signed this specification in presence of two witnesses.

CHARLES H. LAND.

Witnesses:
N. S. WRIGHT,
E. M. SPIELBURG.